Mar. 6, 1923.
H. D GATES
1,447,541
WINDSHIELD CLEANER
Filed July 14, 1921
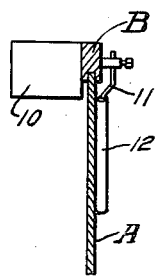
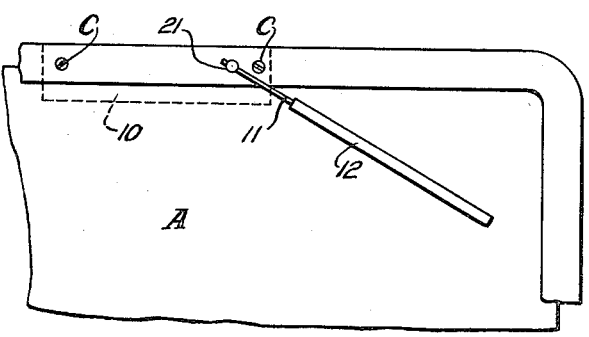
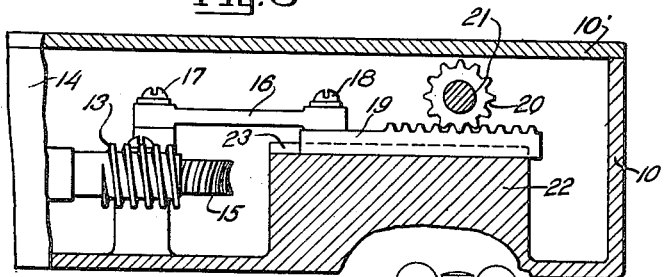
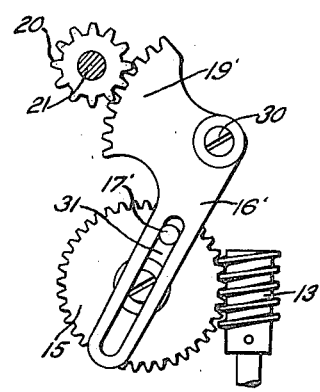
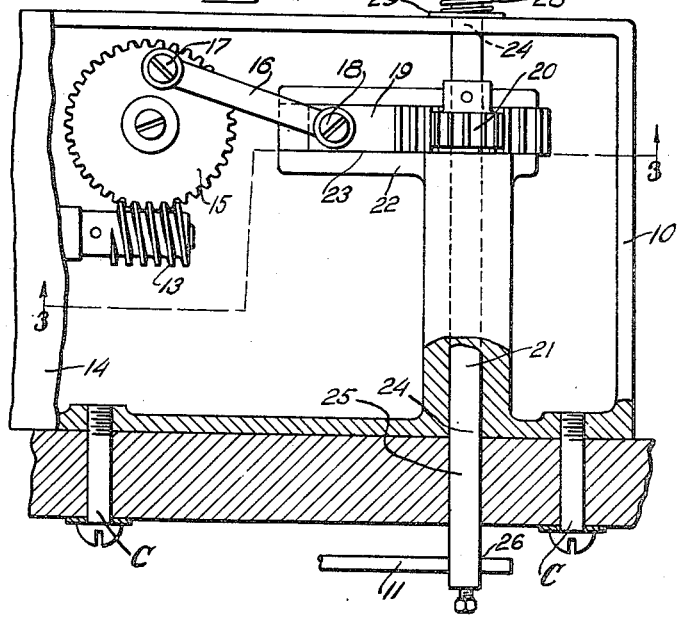
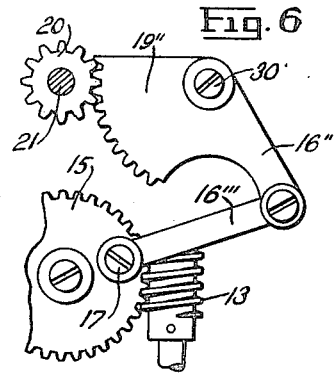
INVENTOR
*Harry D. Gates*
BY
*G. H. Braddock*
ATTORNEY Patented Mar. 6, 1923.

1,447,541

UNITED STATES PATENT OFFICE.

HARRY D. GATES, OF MILFORD, CONNECTICUT.

WINDSHIELD CLEANER.

Application filed July 14, 1921. Serial No. 484,630.

*To all whom it may concern:*

Be it known that HARRY D. GATES, a citizen of the United States, and resident of Milford, in the county of New Haven and State of Connecticut, has invented certain new and useful Improvements in Windshield Cleaners, of which the following is a specification.

This invention relates to a wind shield cleaner especially adapted to the purpose of cleaning the front or outer sides of the wind shields of automobiles.

It is an object of the invention to provide a wind shield cleaner of simple, economical and practical construction, designed to be continuously operated at small expense, either when the vehicle upon which the cleaner is located is in motion, or when the engine of the vehicle is at rest.

Further and more specific objects are to provide a cleaner of the present character the cleaning element of which is oscillatable over the wind shield glass, and the body of which can be conveniently located upon a wind shield frame in such manner as to be practically unnoticeable; to provide novelly and compactly arranged mechanism whereby the cleaning element can be oscillated through any preferred arc, and to locate said mechanism wholly within the body of the cleaner; and to provide in connection with the cleaner, conveniently accessible means for adjusting the cleaning element whereby the squeegee thereof can be made to exert any desired pressure against the wind shield glass.

With the above and other objects in view, the invention comprises the construction, arrangement and combination of parts as now to be fully described and as hereinafter to be specifically claimed, it being understood that changes in details of construction and arrangement of parts may be made so long as within the spirit of the invention and the scope of the claims.

In the accompanying drawing forming a part of this specification,

Fig. 1 is an elevational view of the cleaner in use, as when seen from the front of a wind shield;

Fig. 2 is an end view thereof, looking from the left in Fig. 1;

Fig. 3 is an enlarged sectional view on line 3—3 in Fig. 4, looking in the direction of the arrows, a part of the casing being broken;

Fig. 4 is a top plan view of the device with the cover of the body or casing removed, showing portions of the casing, operating mechanism and wind shield in section and other portions thereof broken away; and Figs. 5 and 6 are views of different modified forms of mechanism that can be substituted in the body or casing for the mechanism of Figs. 3 and 4, to oscillate the cleaning element.

Referring to the drawing by the characters and numerals of reference indicated thereon, A denotes a wind shield glass, and B denotes the frame thereof.

The body or casing 10 of the improved wind shield cleaner, having a removable cover 10′ and containing the novelly and compactly constructed mechanism for imparting oscillatory motion to the cleaning element, may be a casting as shown, secured to the back of frame B in any dependable way, as by means of the screws C, preferably at the top and adjacent one end of the wind shield, and said cleaning element, consisting of an ordinary bar 11 suitably supporting a squeegee 12, is operatively connected with the mechanism of the cleaner, in a manner to be made clear, to be applied to the front or outer side of a wind shield glass.

Of the compact mechanism within the casing for actuating the cleaning element, numeral 13 denotes a worm upon the shaft of a motor 14 suitably housed within the casing, the motor being of any known type suitable for the purpose, such, for example, as an electric or a clock spring motor, 15 denotes a worm wheel with which the worm meshes, the worm wheel being mounted upon a part of the casting constituting the casing, preferably in about the manner shown, 16 denotes a link eccentrically pivoted at one of its ends upon a wrist pin 17 in the worm wheel and pivoted at its opposite end, as indicated at 18, to a rack 19, 20 denotes a pinion with which the rack meshes, and 21 denotes a shaft upon which the pinion is fixed. The rack 19 is supported upon a table 22 forming a part of the casting, the table including a guide way 23 in which the rack reciprocates, and the shaft 21 is slidably fitted in the front and rear walls of the casing, as indicated at 24, to extend beyond both of said front and rear walls, the forwardly extending portion of said rack being also slidably fitted in the wind shield frame, as indicated at 25, and having rigid connection, as indicated at 26, with the bar of the cleaning element.

It will be apparent that when the motor is in operation to rotate the worm 13, rotary movement will be imparted to the worm wheel 15, and through the instrumentality of the link 16, the rack 19 will be reciprocated, the guide way 23 insuring the proper reciprocatory action of the rack, to oscillate the pinion 20, its shaft 21, and the cleaning element rigid upon the shaft. Obviously, the rack and pinion can be made to have any desired relation to each other to oscillate the cleaning element over a sector of any preferred magnitude, and the motor can be run at any suitable speed to hasten or slacken the actuations of the cleaning element.

Simple and accessible means is provided for adjusting the cleaning element so that the squeegee thereof can be made to exert any desired pressure against the wind shield glass. As shown, said means comprises a wing nut 27 adjustable upon the end of that portion of the shaft 21 extending rearwardly of the casing, and a coil spring 28 upon the shaft and having its opposite ends exerting pressure against the wing nut and the rear wall of the casing. Washers 29 may be placed upon the shaft and between the spring and the nut and casing, respectively. Obviously, the cleaning element is adjusted by simply turning the nut in desired direction to put the spring under proper tension. The adjustments of the cleaning element will be slight, so that with the construction as shown and fully described, there need be no fear of the pinion becoming removed from the rack when making adjustments. Should the cleaning element encounter an obstruction, such as ice on the wind shield glass, too firmly seated for the strength of the particular cleaning element, motor or operating mechanism the coil spring will allow the cleaning element to ride over the obstruction and away from the wind shield glass, without liability of damage to any of the working parts of the cleaner.

The cover 10' can be readily removed to make the operating mechanism of the cleaner easily accessible for cleaning, oiling, or repairs, when found necessary.

In Figs. 5 and 6 I have shown two different modified forms of the operating mechanism.

In the case of each of these modifications, the motor, worm 13, worm wheel 15, and pinion 20, may be of the exact construction of those same elements shown in Figs. 3 and 4 and already described. Referring specifically to Fig. 5, a sector 19' pivoted in the casing as at 30 and meshing with the pinion 20, integrally carries an arm 16' having a longitudinal slot 31 slidably receiving a pin 17' in the worm wheel. Referring specifically to Fig. 6, a sector 19'' pivoted in the casing as at 30' and meshing with the pinion 20, integrally carries an arm 16'' pivoted at one end to a link 16''', the opposite end of said link being eccentrically pivoted upon the wrist pin 17 in the worm wheel 15. Evidently, the sector and arm of Fig. 5, and the sector, arm and link of Fig. 6, both constitute mechanism between the worm wheel and pinion that is the equivalent of the link and rack of Figs. 3 and 4.

Having thus fully described the invention, what I claim as new and desire to secure by Letters Patent is:

1. A wind shield cleaner comprising a casing secured upon a wind shield frame, a cleaning element for wiping a wind shield glass, an oscillatable and longitudinally movable shaft mounted in the casing and supporting the cleaning element, means for longitudinally adjusting the shaft to regulate the pressure with which the cleaning element bears against the wind shield glass, a pinion fixed upon the shaft, and a rack device meshing with the pinion, said pinion being adapted to move transversely of the rack device when the shaft is longitudinally adjusted.

2. A wind shield cleaner comprising a casing secured upon a wind shield frame, a cleaning element for wiping a wind shield glass, an oscillatable and longitudinally movable shaft mounted in the casing and supporting the cleaning element, means for longitudinally adjusting the shaft to regulate the pressure with which the cleaning element bears against the wind shield glass, a pinion upon the shaft, and a rack device meshing with the pinion, said shaft moving transversely of the rack device when adjusted.

Signed at Bridgeport, in the county of Fairfield, and State of Connecticut, this 13th day of July, A. D. 1921.

HARRY D. GATES.